Patented Mar. 9, 1926.

1,576,440

UNITED STATES PATENT OFFICE.

HARRY C. MARTIN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

FILTERING MEDIUM.

No Drawing.   Application filed November 13, 1924.   Serial No. 749,772.

*To all whom it may concern:*

Be it known that I, HARRY C. MARTIN, a citizen of the Dominion of Canada, residing at Niagara Falls, county of Niagara, and State of New York, have invented a new and useful Improvement in Filtering Mediums, of which the following is a full, clear, and exact description.

This invention relates to porous articles and particularly to porous structures consisting of mineral granules such as silica, garnet, silicon carbide, fused alumina, fused magnesia, fused aluminum silicate, glass, or other highly refractory natural or artificial crystalline mineral substances bonded together with a bond consisting of a synthetic resin, such as phenol resin, in such proportion as to produce an article which is porous and permeable to liquids and gases and suitable for use as a filter, electrolytic diaphragm or other similar purpose.

I give the following as a typical example of making a filtering medium in accordance with my invention: I first take graded silicon carbide grains of the proper size or grit for the porosity desired which may vary from very coarse particles, for example No. 10 grit, down to No. 180 or finer. I will described however in this specific example the making of a filter plate using No. 16 mesh grains. I add a sufficient quantity of a resin solvent to coat the surfaces of the grains. I prefer to employ furfural as the coating solvent, using this substance in the proportion of approximately 20 cubic centimeters thereof to 1000 grams of grains. The amount of furfural is varied with the size of grains. Furfural is an aldehyde which has the property of acting with the phenol resin to form also a resin of a similar character. Having moistened the silicon carbide grains with a sufficient quantity of the solvent to coat all of their surfaces, I then mix therewith the phenol resin such, for example, as bakelite in powdered form. If the grains are of medium size or grit, a sufficient quantity of resin will be added to constitute approximately 8 per cent by weight of the mixture. The resin may, however, constitute from 3 to 12 per cent by weight of the mixture, depending upon the size of the grains, the finer grits requiring more of the resin than the coarser grits to obtain equal mechanical strength. If greater porosity is wanted, less resin is used.

When the resin is thus added to the moistened grains, the furfural dissolves enough resin to coat the grains uniformly over their surfaces with the solution of furfural and resin. The ingredients are mixed thoroughly and form a mass of fairly wet consistency, a little drier than a very thick mortar and one which can be readily tamped into a mold to form a strong solid mass, but having a sufficient degree of viscosity to flow somewhat under the tamping operation and fill out corners and thin sections of the shaped article. After this mixture is thoroughly incorporated, it is tamped by hand in iron or wooden molds of the shape desired for the filter plate. The parts of these molds are preferably so assembled that the molded piece or plate is tamped on edge as a more uniform article is obtained thereby. The material is then removed from the mold and baked in an oven for fifteen hours at a temperature of about 350° F. after which it is ready for use.

As a modification of my process for the molding of curved plates, I may mold these in a flat mold and when they are taken out of the mold while they are still soft and flexible, place them on a curved surface or platen or otherwise form them to any new shape required. They are then baked in the manner already described. I do not confine myself to this particular method of working with artificial resins. Many other methods of molding are well known.

Filter plates made in accordance with this invention are especially adapted for acid solutions including hydrofluoric acid but are not suitable for strong alkaline solutions.

Heretofore filtering mediums made out of mineral granules bonded together with various binders such as ceramic binders or cements have not possessed great mechanical strength when made in large sizes. This was due to the fact that porosity was a prime requirement and in order to obtain this the amount of binder used had to be cut down to a minimum. The result of this has been that it has been impossible to produce plates of large dimensions and thin sections. My process overcomes this difficulty on account of the strength and toughness of the binder. Pieces made in accordance with my process have great mechanical strength and can be produced plane or curved in lengths of 6 or 8 feet or more, and ¼ or ⅜ths of an inch thick. This has never been accomplished in one integral piece with any other material with which I am familiar.

By filtering medium I mean any porous structure adapted not only for filtering liquids containing solid matter but also for various physical and chemical processes involving the agitation of liquids, humidifying or mixing of gases, oxidation, activation, absorption, cyaniding, etc.

I claim:

1. A filtering medium consisting of a porous structure formed from a compacted and baked mixture comprising mineral grains moistened with a resin solvent, and a synthetic resin, substantially as described.

2. A filtering medium consisting of a porous structure formed from a compacted and baked mixture comprising mineral grains moistened with a resin solvent, and a phenol resin, substantially as described.

3. A filtering medium consisting of a porous structure formed from a compacted and baked mixture comprising mineral grains moistened with furfural, and a phenol resin, substantially as described.

4. A filtering medium consisting of a porous structure formed from a compacted and baked mixture comprising mineral grains moistened with a resin solvent, and a synthetic resin, the synthetic resin constituting between 3 and 12 per cent by weight of the mixture, substantially as described.

5. A filtering medium consisting of a porous structure formed from a mixture of granular material having the grain surfaces moistened with a resin solvent, and a synthetic resin, substantially as described.

6. A filtering medium consisting of a porous structure formed from a mixture of refractory granular material having the grain surfaces moistened with a resin solvent, and a synthetic resin, substantially as described.

In testimony whereof I have hereunto set my hand.

HARRY C. MARTIN.